May 22, 1928.
A. B. McKAIN
1,671,038
MACHINE FOR SNIPPING THE ENDS FROM BEANS
Filed May 12, 1925
3 Sheets-Sheet 1
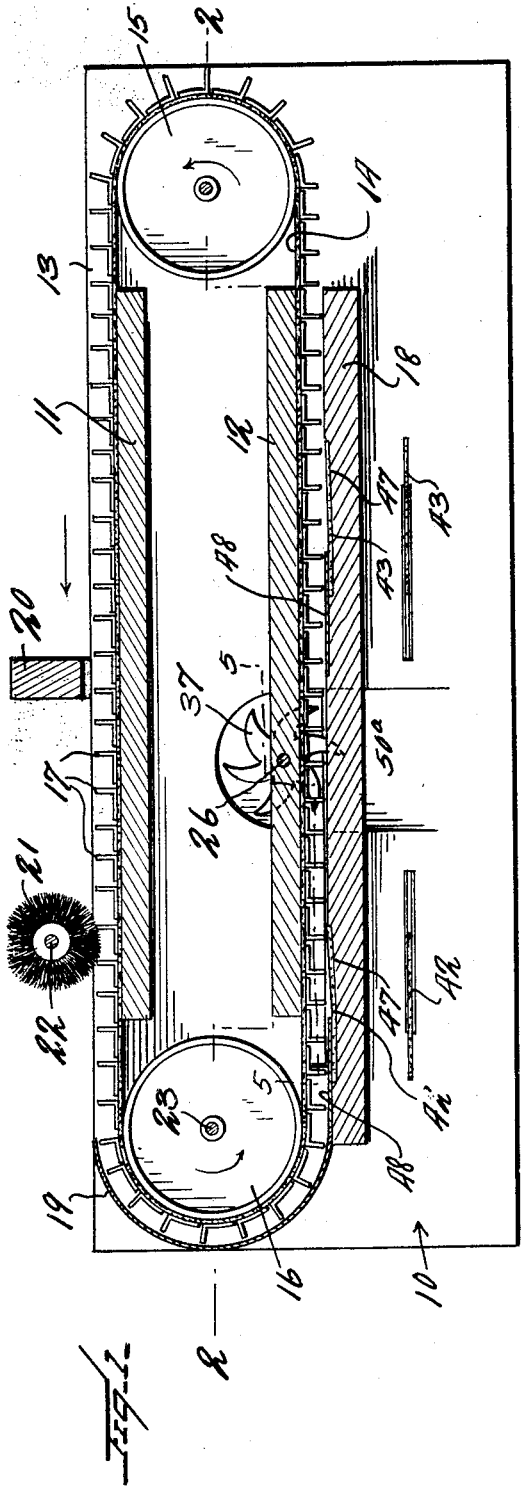
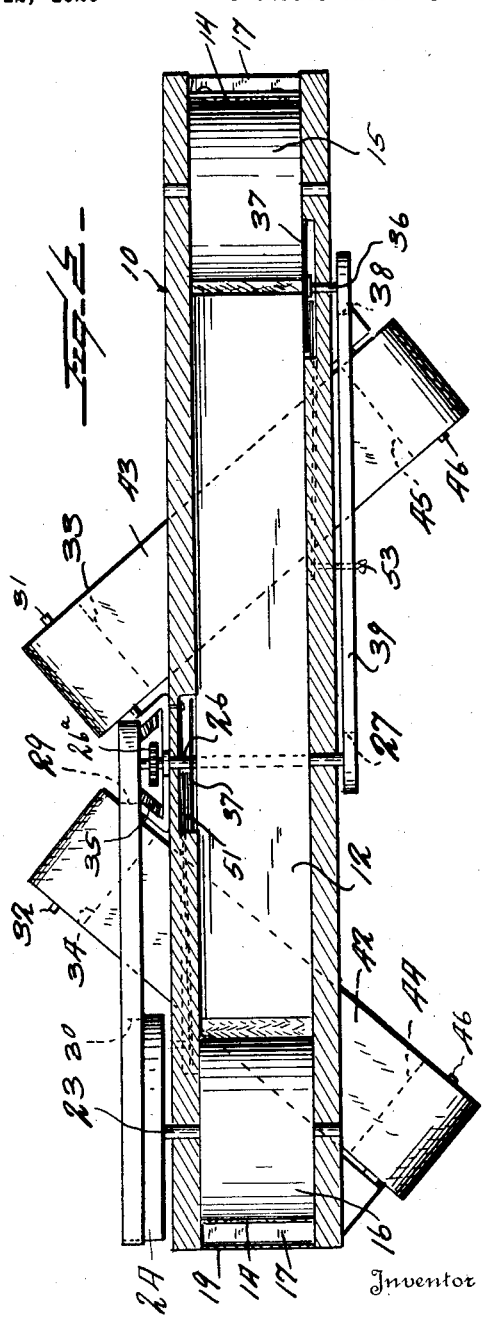
Inventor
A. B. McKain
By Watson E. Coleman
Attorney May 22, 1928. 1,671,038
A. B. McKAIN
MACHINE FOR SNIPPING THE ENDS FROM BEANS
Filed May 12, 1925 3 Sheets-Sheet 2
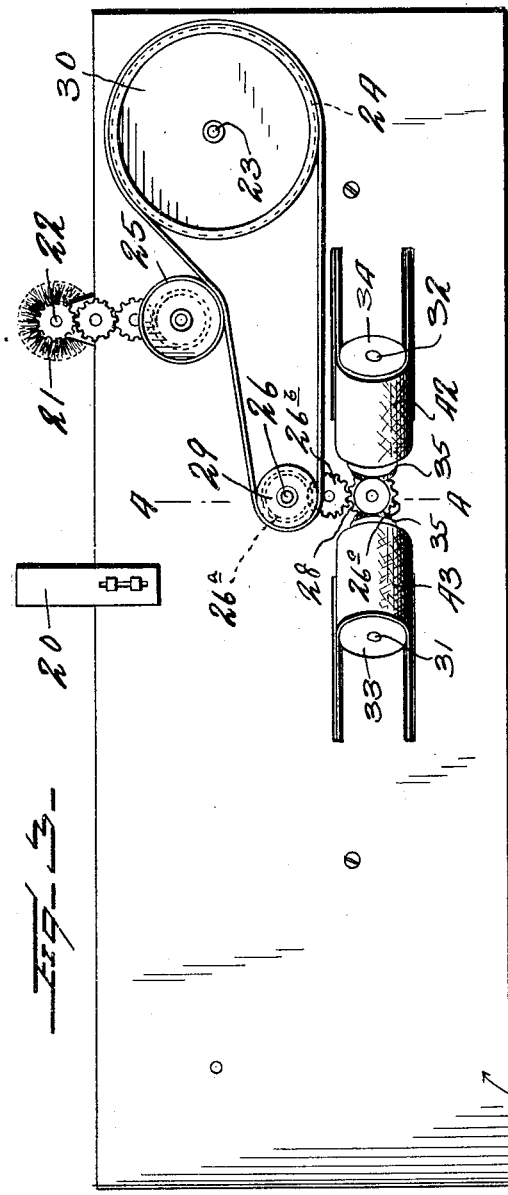

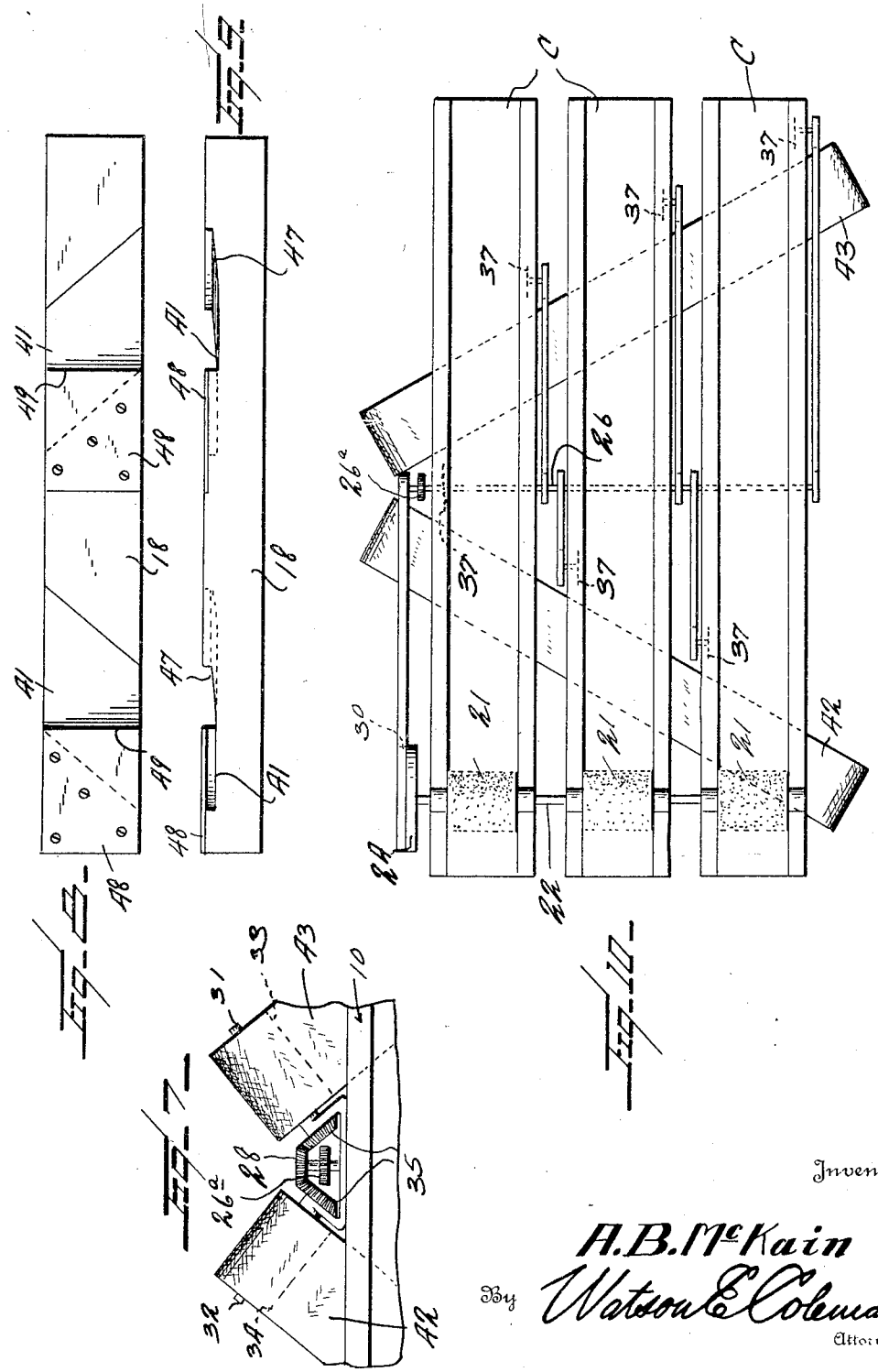

Patented May 22, 1928.

1,671,038

UNITED STATES PATENT OFFICE.

ALPHA B. McKAIN, OF PEETZ, COLORADO.

MACHINE FOR SNIPPING THE ENDS FROM BEANS.

Application filed May 12, 1925. Serial No. 29,811.

This invention relates to the art of preparing vegetables for canning, and the general object of the invention is to provide a machine which is particularly designed for snipping off the opposite ends of green or wax beans preparatory to canning.

One of the more specific objects of the invention is to provide a machine of this character having a conveyor extending longitudinally of the machine along which the beans are carried, and provide a transversely operating bean shifter, as it may be termed, which will carry the beans laterally and into the path of a knife which will cut off the extremities of the beans in their onward passage, and another means for shifting the beans in the other direction to cut off the other ends of the beans.

A further object is to provide a mechanism of this character having a rotary knife or knives past which the beans are carried, and provide means for supporting the beans as they are carried beneath said knives, said knives acting to cut off the extreme ends of the beans.

A still further object is to provide a mechanism of this character which is adapted to be used with a plurality of conveyors so as to operate upon a large number of beans at the same time or with one conveyor and thus be adapted for either a large or a small output.

Other objects will appear in the course of the following description.

My invention is illustrated in the accompanying drawings, wherein:—

Figure 1 is a longitudinal sectional view of a bean snipping machine constructed in accordance with my invention;

Figure 2 is a section of the line 2—2 of Figure 1;

Figure 3 is a side elevation of the machine;

Figure 4 is a section on the line 4—4 of Figure 3;

Figure 5 is an enlarged fragmentary horizontal section on the line 5—5 of Figure 1;

Figure 6 is a fragmentary elevation of a portion of the wall 13 showing the stop 51;

Figure 7 is an enlarged fragmentary plan view of the conveyors 42 and 43 and the driving means therefor;

Figure 8 is a top plan view of the table over which the main conveyor moves;

Figure 9 is a side elevation of the table;

Figure 10 is a top plan view of a machine having a plurality of tables.

Referring to the drawings, it will be seen that my mechanism comprises, as illustrated in Figures 1 to 9, a supporting frame 10 having the upper and lower platforms or tables 11 and 12 respectively. The sides of the supporting frame extend above the upper platform a certain distance, as at 13. Operating over the respective upper and lower faces of the platforms or tables 11 and 12 is an endless belt or like element 14 formed to provide a series of pockets. This belt 14 passes over the two belt wheels 15 and 16 located adjacent opposite ends of the supporting frame and the belt travels, as shown by the arrow in Figure 1. The pockets are formed by angular members which may be made of sheet metal and which are designated 17, attached to the outer face of the belt. These pockets do not affect in any way the flexibility of the belt in its passage around the pulleys or band wheels 15 and 16. The pockets are open as they pass over the table 11 and are inverted so that they open downward as the belt passes along the under surface of the table or platform 12. These pockets have a length approximately that of an ordinary wax bean and have a depth equal to the depth of a normal size wax bean. The beans may be fed from a hopper or any other suitable delivery member into the pockets at the right hand end of the machine, as indicated in Figure 1, and are carried along in the direction of the arrow, as previously stated.

Disposed below the platform or member 12 is a table 18, as it may be termed, which is disposed below the body 12 a distance approximately equal to the depth of the pocket 17 plus the thickness of carrier belt 14. Extending partially around the band wheel 16 and concentric thereto is the shield 19 which extends downward and forward and discharges upon the upper face of the plate or table 18 so that the pockets of the plate or table 18 so that the pockets 17 pass around between the band wheels 16 and the shield 19 and then move over upon the upper face of the plate 18 so that the beans now rest upon the upper face of the plate.

As the pockets move along over the upper face of the table 11, the pockets pass beneath a transversely extending board or equivalent member 20 which is disposed so that the upper edges of the pockets just escape it and this stops the forward movement of any bean which may rest upon a bean resting on the top of a pocket, the object being to provide means for preventing three beans from being superposed in any one pocket. After a pocket has passed the strike-off member 20, it passes beneath a rotary brush 21 mounted upon a shaft 22. This brush has bristles arranged in rows parallel to the pockets and the rotation of the brush, which rotates reversely to the movement of the belt or band, acts additionally with the strike-off blade to sweep off any beans that might have gathered within a pocket and also to straighten the beans so that they will lie parallel to the walls of the pocket.

The band wheel 16 is driven by means of a shaft 23 having a power pulley 24 to which power is applied and a pulley whereby power is carried to a pulley 25 operating the brush shaft 22. The pulley 24 and the shaft 23 cause the movement of the band wheel 16 and this operates the belt 14. Extending transversely of the path of movement of the conveyor is a shaft 26. The shaft 26 also carries upon it a rotatable knife 37 having curved blades. This shaft 26 has thereon a belt pulley 29 and also carries a gear wheel 26ª operating a gear wheel 26ᵇ. The belt pulley 29 is driven from a pulley 30 mounted upon the shaft 23.

Disposed at an angle of 45° to the shaft 26 are two shafts 31 and 32 carrying drums or band wheels 33 and 34 for a purpose to be later stated, and these shafts 31 carry beveled gear wheels 35 which mesh with the beveled gear wheel 26ª driven from wheel 26ᵇ. Also extending transversely of the path of movement of the conveyor is a shaft 36 which carries upon it a second rotatable knife 37 having curved blades. This shaft 36 carries upon it a band wheel 38 which is connected by a belt 39 to the pulley 27 on shaft 26. Preferably the brush shaft 22 is driven through intermediate gearing from the pulley 25 which bears upon the belt which connects the pulley 30 with the pulley 29.

The upper face of the plate or table 18 is formed with convergently directed recesses or grooves 40 and 41 over which two belts 42 and 43 pass. These are endless belts and the belts pass over the pulleys 33 and 34 previously referred to at one end and over pulleys 44 and 45 at the opposite end, these pulleys being mounted upon diagonally disposed shafts 46 mounted upon the frame in any suitable manner. The recesses 40 and 41 have a depth only very slightly greater than the thickness of the belts 42 and 43 and adjacent the inner side walls of these recesses the bottom of each recess is somewhat raised, as at 47, so that each belt 42 or 43 has its inner edge or margin disposed approximately on a level with the upper face of the table 18.

Attached to the face of the table 18 outward of the belts 42 and 43 are metallic plates 48, these plates extending over the belts 42 and 43 respectively, the edges 49 of the plates 48 being disposed at right angles to the length of the table 18. This plate 48 is disposed very close to the upper surface of the corresponding belt 42 or 43. It will be seen now that as the beans are moved from the left to the right in Figure 1 within the conveyor pockets 17 that the beans will first cross the path of travel of the laterally running belt 42 and that thus the beans will be shifted in a direction diagonal to the path of movement of the carrier or conveyor 14. The belt 43 runs reversely to the belt 42 and, therefore, when the beans on the carrier 14 reach the belt 43 they will be carried toward the right. The motion of the beans is just sufficient to carry the extremity of the bean in each case across the path of travel of a knife, which will snip off the end of the bean, as will now be described.

The side wall 13 at a point at the end of the inclined recess 40 is recessed, as at 50. This recess starts from a point beyond the outside edge of the belt 42, for example, as shown in Figure 5, and extends beyond the corresponding knife 37 a certain distance, the table 12 not extending into this recess so that the bottom of the recess is open. The knife 37 is disposed in a plane parallel to and slightly to one side of the band or conveyor 14, and disposed within the recess 50 and extending at a slight inclination to the confronting edge of the conveyor 14 is a stop and guide consisting of a metallic strip 51 which at one end is attached to the wall 13 by means, for instance, of a bolt or like fastening device 52 and at its other end beyond the belt 42 bears against an adjusting screw 53 which passes through the wall 13. This adjusting screw has preferably swiveled engagement with the face of the plate but the strip 51 might be of sufficient resilience and be urged inward by its own resilience against the action of the spring 23 so that the screw 53 would act to push the strip inward, while the spring would act to push it outward, though I prefer to have a positive engagement between the guide strip 51 and the screw 53. When the screw 53 is turned inward, the strip 51 will be given an inclination to the edge of the belt or conveyor 14 and preferably will be given a slight curvature.

From Figure 1 it will be seen that when the pockets 17 reach the belt 42 and each pocket passes the edge 49 of the corresponding plate 48, the beans will drop down onto the diagonal belt 42 and this belt tends to draw the beans out of the pockets and toward the guide strip 51. The guide strip being at an inclination, it is obvious that the bean will be shifted as it moves across the belt 42 gradually further and further out with only one end bearing against the strip 51 until at a certain point the bean is sufficiently far apart to have its extremity cut off by the knife 37. At this point the bean has passed the belt 42 and its projecting extremity rides upon a wire or other supporting member 54. The bean is thus supported upon the conveyor 14 and the extremity of the bean is supported upon the support 54.

The knife rotates in a counter clockwise direction, as shown in Figure 1, so that a curved blade of the knife cuts downward and slices off the extremity of the bean. The bean then moves along with the pockets 17 and conveyor 14 until the bean reaches the belt 43. Here it is shifted in the reverse direction until it is carried into a recess 50 and against a member 51, as previously described, and in the same manner as previously described is shifted reversely to the direction in which it is shifted by the belt 42 so that the opposite end of the bean is cut off by the corresponding knife 37. The bean is then moved on and is discharged from the pockets 17 where the pockets pass beyond the table or plate 18 and are in condition for canning with the opposite ends of the bean snipped off.

While I do not wish to be limited to this, I preferably support the free end of the guide strip 51 between two metallic bars or guides 55, as shown in Figure 6, which support the guide strip so that it just escapes or slightly touches a corresponding belt 42. It will be understood that the recess 50 may be of any depth but that it need be only relatively shallow inasmuch as it is only necessary to snip off the end of the bean.

I have described a construction wherein there is a single channel, as it may be termed, having a width between the walls 13 approximately equal to the length of a normal size bean. In Figure 10, however, I show a construction wherein there are three of these channels C disposed between walls 13 and it is to be understood that any number of channels might be used. In such a construction as this there are three conveyors 14, each operating in its individual channel, but there are only two transverse belts 42 and 43 operating across all of the individual belts for shifting the beans or the individual belts transversely a sufficient distance to permit the ends to be snipped off by the rotatable knives 37, there being a pair of these knives 37 for each of the channels C. Except for the fact that there are a plurality of belts or conveyors 14 and a plurality of pairs of knives 37, the mechanism is precisely the same as that heretofore described and operates in exactly the same way.

It will be understood that the recesses 40 in the side walls 13 through which the belts 42 and 43 pass is just large enough to permit free passage of the belts. The belts should be supported by the bottom of these channels 40 so that the bottom of the belt is in contact with the lower faces of the metallic shields 48 and that the forward sides of the channels should be slightly raised so as to hold the belts 42 and 43 up with their edge on a level with the upper face of the table 18. The corners of the walls defining the forward ends of the channels 40 may be slightly rounded to prevent the beans from catching, though this is not absolutely necessary. The object, of course, is to form a level and unobstructed surface along the entire extent of the table or plate 18 so that beans may be dragged freely by the conveyor 14. This will not be difficult as the metal pieces 48 are thin and the belts 42 and 43 are wide. The plate 18 may be secured to the frame in any suitable manner but should be so secured as to permit its being readily removed to allow work on the inside of the machine. Thus, for instance, bolts or studs may be put through the side of the frame and through the edge of the plate 18. This plate 18 may be made relatively thin. It will be understood that the carrier 14 and the cross brace 17 which define the cups or pockets are to occupy all the space between the sides 13 and the frame so that there will be no space between the ends of the members 17 and the sides 13 of the frame such as would allow beans to collect there and would act to virtually lengthen the pockets, which must be as short as practical. The recess 50 is merely to provide an opening for the ends of beans to be moved into. This recess might be longer if desired or wider if necessary but it need not be deeper in the wall than to allow sufficient room for the ends to be moved into. The bottom of this recess should be on a level with the top of the plate 18 and the top of the cavity need be no higher than the top of the pockets between the members 17. The opening 50$^a$ is simply a continuation of the recess but having no bottom. The support 54 may be mounted within the recess in any suitable manner.

It will be understood that it is particularly necessary that not more than one bean should be disposed in vertical relation within any one pocket, as under these circumstances the lower bean might be shifted by the belt 42 or 43 but the upper bean would remain stationary within the pocket and would not have its ends snipped off. Of course, two beans might be lodged in the pocket parallel to each other and both be disposed at the bottom of the pocket and, therefore, engaged with the belt 42 or 43 and in this case both beans would be shifted laterally. Preferably, however, there is one bean to each pocket and it is for this reason that I provide the strike-off plate 20 and the brush 21 which tend to shift the beans into proper position within the pocket. Of course, when beans are straight two or even three beans might be handled in each pocket but this will not do where the beans are curved, and when the beans reach the position shown by dotted lines in Figure 5 they will then be snipped off at the ends, as previously described.

It will be understood that the transversely extending board or member 20 is raised sufficiently above the upper edges of the pockets 17 as to prevent more beans getting to the brush 21 than the latter can handle. This member 20 is adjustable so as to be raised or lowered at will but its normal position will be above the tops of pockets 17 far enough to allow one bean lying on top of the pocket 17 to pass under but low enough to prevent passage of any beans which may lie on top of those which rest immediately on top of the pockets 17. In other words, the normal position of member 20 will be such that the bottom of said member will be above the top of pocket 17 a distance approximately equal to the thickness of a normal size bean. The duties of straightening beans, holding back all beans except those properly disposed in the pockets 17, and so on, belong to the rotatable brush 21. Of course, the members 20 will assist somewhat in this matter of straightening and holding back the beans but brush 21 has the major portion of the work to do and must come in actual contact with the tops of pockets 17.

It is to be understood that the belts 42 and 43 are to travel at such angle and speed as will release the beans from the dragging action of the pockets 17 and carry the beans freely forwardly and transversely. I have illustrated the angle of the belts 42 and 43 as being of an angle of approximately 45°. The speed, therefore, of these belts would need to be slightly more than 41% than that of carrier 14, or in other words belts 42 and 43 should travel at a speed approximately 45% greater than the speed of conveyor 14 and the purpose is to cause the beans to be carried by belts 42 and 43 in their forward movement as well as across at a speed slightly greater than the speed of the carrier 14 so that their transverse movement should not be hindered by the dragging action of the pockets 17. It will be understood, however, that the speed ratio of the belts 42 and 43 to the carrier 14 would depend entirely upon the angle of these belts 42 and 43.

I claim:—

1. A machine for snipping the ends off beans including a table, an endless conveyor having its upper flight moving over said table and having bean retaining pockets open at their ends, means disposed above the path of travel of the conveyor upon said table acting to prevent more than one bean being disposed in a pocket including a strike-off plate beneath which the upper ends of the pockets pass, said plate being elevated above the path of movement of the upper ends of the pockets a distance less than the average thickness of a bean, and a brush rotating in a direction reverse to the movement of the conveyor and disposed immediately above the upper ends of the pocket walls and extending transversely of the direction of movement of the conveyor and acting to straighten the beans and brush off any extra beans.

2. A bean snipping mechanism of the character described including a longitudinally extending conveyor having outwardly opening pockets, each pocket having a depth equal to the combined thickness of a predetermined number of beans, means for causing the belt to travel in one direction, means for moving an extra bean from the pocket comprising a transversely extending bar disposed with its lower edge immediately above the path of movement of the upper edges of the pockets but spaced therefrom, means for causing the beans to lie straight within the pockets and approximately parallel to the side walls thereof comprising a rotary brush mounted immediately above the conveyor and having radiating bristles contacting with the upper edges of the walls, and means for rotating the brush in a direction to carry the bristles adjacent the conveyor in a direction reverse to the direction of movement of the conveyor.

3. In a machine for snipping the ends from beans, a longitudinally traveling conveyor, a transversely traveling conveyor moving below the longitudinally traveling conveyor, the first named conveyor having pockets which are inverted upon the second named conveyor, means engaging the ends of the beans and preventing further movement by the transverse conveyor, means for snipping off the ends of the beans comprising a rest upon which the extremity of the bean will be carried by the longitudinally movable conveyor and a rotatable knife comprising a plurality of curved knife blades, the knife being disposed above the rest for the end of the bean, and means for rotating the knife in a direction to cause the blades to sweep downward across the plane which intersects the upper end of said rest.

4. A machine for snipping the ends off beans including a table, an endless conveyor facing in one direction over the face of the table and having a series of pockets open at the top and at their ends and inverted upon the table, the table having a diagonally disposed recess upon its face extending transversely across the path movement of the conveyor, an endless belt disposed in said recess, means for driving the belt, a plate extending over the recess at the entrance side of and over the belt and having its outer edge disposed at right angles to the conveyor and parallel to the walls of the pockets, said belt acting to shift the beans disposed in said pockets laterally, and means for limiting the lateral movement of the beans in the pockets and cut off the ends of the beans.

5. In a machine for snipping the ends from beans, a longitudinally travelling conveyor, a transversely traveling belt moving below the conveyor, the conveyor having pockets inverted upon the belt and the belt being disposed diagonally to the path of movement of the conveyor, a side wall parallel to the conveyor and disposed adjacent one side edge thereof towards which the belt moves, said side wall being recessed longitudinally, the recess being longer than the width of the belt, an inclined stop strip mounted against said recess and against which the extremity of the bean is forced by the belt, a rotatable knife disposed against the belt and acting to cut off the extremity of the bean, and means for adjusting the inclination of said stop strip.

6. A bean snipping device of the character described including a longitudinally extending conveyor, a table over which the conveyor moves, pockets on the conveyor inverted on said table, a transversely extending belt moving across the table and over which the pockets move, said belt being disposed any angle other than a right angle to the conveyor and the belt being adapted to engage the beans in the pockets and shift the beans laterally, a rotatable knife disposed parallel to the conveyor and beyond the transverse belt and having a plurality of curved radially extending cutting blades, an inclined stop strip extending across the upper face of the belt and outward of but beyond said knife and against which the ends of the beans are carried by the belt, and a bean end support extending approximately parallel to the knife but outward of the same and extending beyond the knife toward the belt, the support being disposed below the rotative axis of the knife whereby the blades of the knife may cut downward upon the bean.

In testimony whereof I hereunto affix my signature.

ALPHA B. McKAIN.